United States Patent
Oki

(10) Patent No.: US 7,852,532 B2
(45) Date of Patent: Dec. 14, 2010

(54) IMAGE FORMING APPARATUS AND IMAGE FORMING METHOD

(75) Inventor: Makoto Oki, Tokyo (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 634 days.

(21) Appl. No.: 11/679,885

(22) Filed: Feb. 28, 2007

(65) Prior Publication Data

US 2007/0236760 A1  Oct. 11, 2007

(30) Foreign Application Priority Data

Apr. 6, 2006  (JP)  .............................. 2006-105152

(51) Int. Cl.
    *G03F 3/08* (2006.01)
(52) U.S. Cl. ................... 358/519; 358/1.9; 358/518; 358/520; 358/521; 358/522; 382/167; 382/168
(58) Field of Classification Search ........... 358/1.9, 358/518–521; 382/167
    See application file for complete search history.

(56) References Cited

U.S. PATENT DOCUMENTS

| | | | | |
|---|---|---|---|---|
| 5,123,060 A * | 6/1992 | Cho et al. | .................... | 382/274 |
| 5,212,560 A * | 5/1993 | Hattori et al. | ................ | 358/300 |
| 5,473,373 A * | 12/1995 | Hwung et al. | ................ | 348/254 |
| 5,589,914 A * | 12/1996 | Katsuhara | ..................... | 399/60 |
| 5,754,683 A * | 5/1998 | Hayashi et al. | ............. | 382/167 |
| 5,920,407 A * | 7/1999 | Erickson et al. | ............. | 358/504 |
| 6,052,138 A * | 4/2000 | Kojima | ........................ | 347/188 |
| 6,226,108 B1 * | 5/2001 | Toyohara et al. | ............. | 358/519 |
| 6,574,010 B1 * | 6/2003 | Ohnuma et al. | ............... | 358/1.9 |
| 6,644,772 B2 * | 11/2003 | Choi | ........................... | 347/19 |
| 6,690,490 B1 * | 2/2004 | Murakami | ................... | 358/1.9 |
| 6,965,462 B1 * | 11/2005 | Henderson et al. | .......... | 358/504 |
| 7,142,712 B2 * | 11/2006 | Maruoka et al. | ............. | 382/168 |
| 7,177,481 B2 * | 2/2007 | Kaji | ........................... | 382/265 |
| 7,251,056 B2 * | 7/2007 | Matsushima | ................. | 358/1.9 |
| 7,265,795 B2 * | 9/2007 | Ohyama et al. | .............. | 348/675 |
| 7,292,370 B2 * | 11/2007 | Iwaki | .......................... | 358/1.9 |
| 7,307,752 B1 * | 12/2007 | Mestha et al. | ................ | 358/1.9 |
| 2004/0012800 A1 | 1/2004 | Nakane et al. | | |

FOREIGN PATENT DOCUMENTS

| | | |
|---|---|---|
| JP | 07-230213 A2 | 8/1995 |
| JP | 2003-140406 | 5/2003 |
| JP | 2003-298842 | 10/2003 |

OTHER PUBLICATIONS

Office Action in JP 2006-105152 dated Jul. 22, 2008, and English Translation thereof.

* cited by examiner

*Primary Examiner*—King Y Poon
*Assistant Examiner*—Richard Zhu
(74) *Attorney, Agent, or Firm*—Buchanan Ingersoll & Rooney PC

(57) ABSTRACT

An image forming apparatus including: an outputting section to output a chart which has a gradation pattern in a low-density area, the gradation pattern including patches, each of the patches having a density; a reading section to read-in the density of each of the patches; a calculating section to calculate, based on the density, an adjusting value to conduct a gamma correction; and an output adjusting section to conduct an adjustment of an output in the low-density area based on the calculated adjusting value.

10 Claims, 11 Drawing Sheets

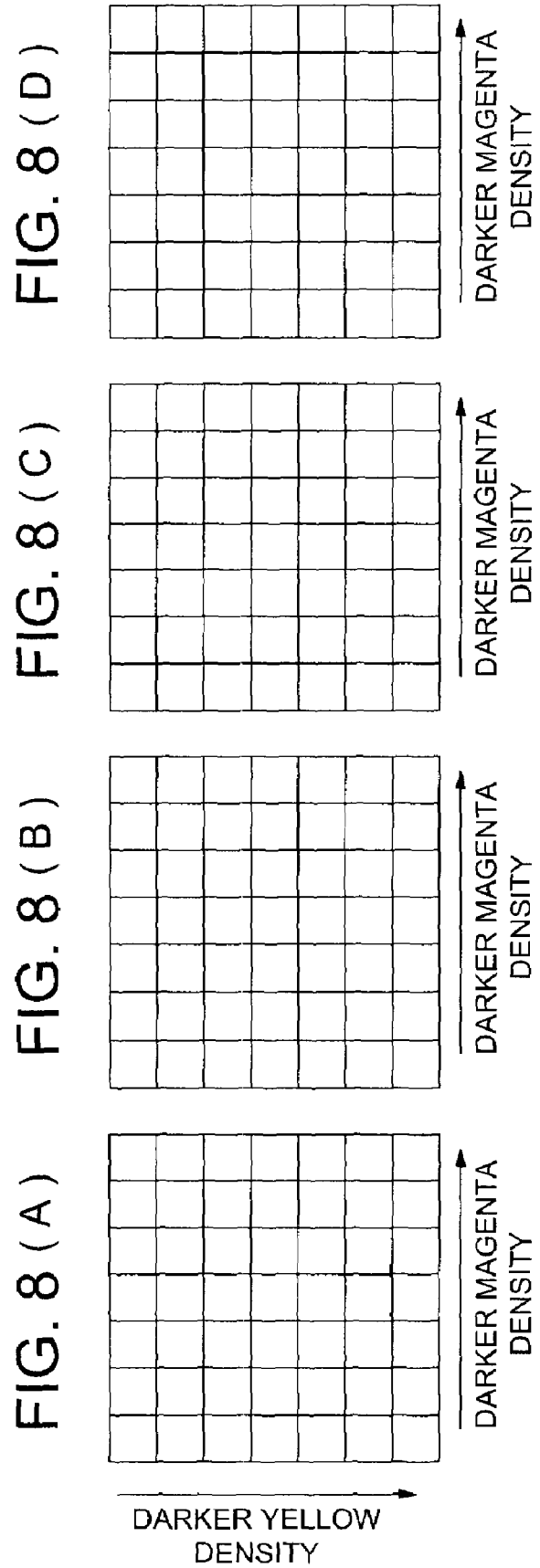

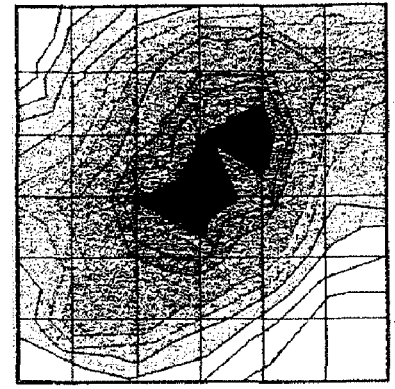 FIG. 9 (D-1)
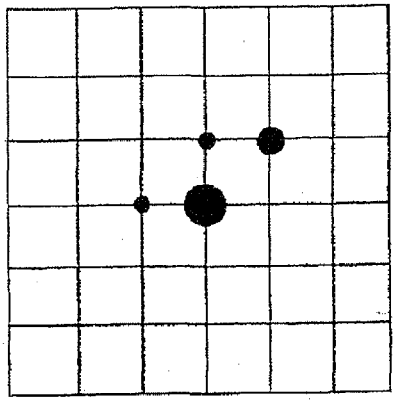 FIG. 9 (D-2)
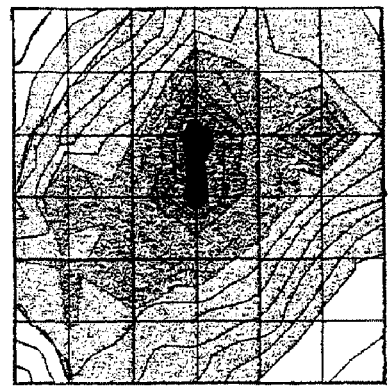 FIG. 9 (C-1)
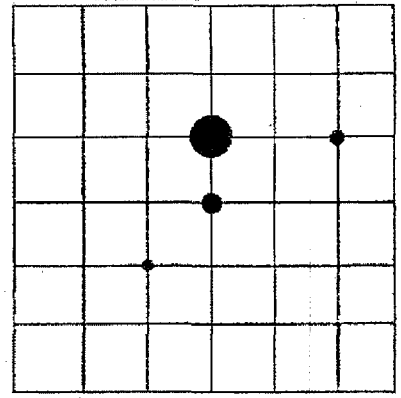 FIG. 9 (C-2)
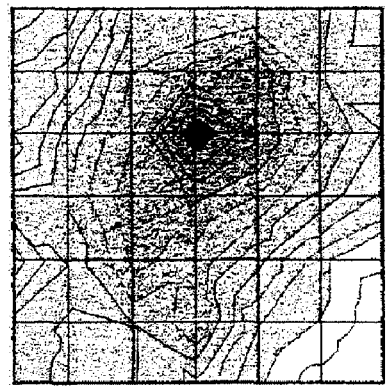 FIG. 9 (B-1)
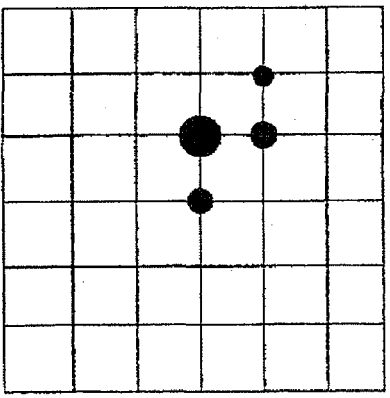 FIG. 9 (B-2)
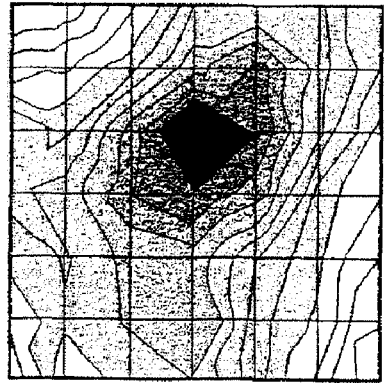 FIG. 9 (A-1)
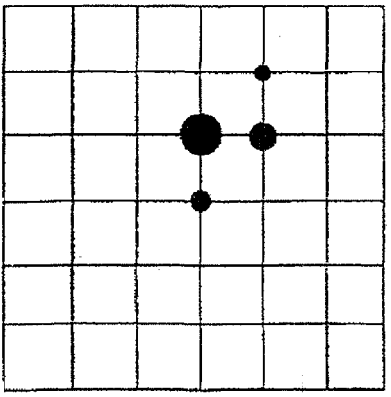 FIG. 9 (A-2)

IMAGE FORMING APPARATUS AND IMAGE FORMING METHOD

CROSS REFERENCE TO RELATED APPLICATION

The present application is based on Japanese Patent Application No. 2006-105152 filed with Japan Patent Office on Apr. 6, 2006, the entire content of which is hereby incorporated by reference.

BACKGROUND OF THE INVENTION

1. Technical Field

The present invention relates to an image forming apparatus, which automatically performs an image correction in low-density areas, and to an image forming method for controlling such apparatus.

2. Description of Related Art

When forming images by an image forming apparatus, information included in an original image may be altered according to gradation characteristics of the image forming apparatus. Therefore, gamma corrections have conventionally been conducted in order to correct the inherent gamma value of the image forming apparatus, to approximate the original image.

In a usual printer, at an area where the input value just rises from 0 (zero) the output value hardly increases, in an intermediate area the output value increases exponentially, and in a area where the input value has risen to a certain extent the increase of the output is curved. This exhibits an S shaped characteristic curve. In order to approximate the gamma value of this gradation characteristic to 1, a gradation correction curve is applied, which is symmetrical to the characteristic curve of the printer with respect to a line having a gradient of 1 and passing the coordinate origin. This is the conventional gamma correction to realize a linear printer gradation (see for example, Patent Document 1).

Patent Document 1: Unexamined Japanese Patent Application Publication No. H07-230213

However, in low-density areas, where the density is lower than in the intermediate area, a color rise, in which a color is started to be printed on paper, does not occur until the input value increases to be a certain large value. And it is needed to make the correction value for correcting the low-density area to be greater than that for other areas. In cases where the aforementioned gradation correction curve is applied for all density areas, when the gradation correction curve is smoothened in order to make a proper correction for all the density areas, the low-density area receives no color, and when the gradation curve is adjusted such that the low-density area does receive color, the smoothness of the curve is degraded resulting in improper correction. Primarily for this reason, it has been difficult to automatically correct the gradation in low-density areas.

Conventionally, in order to correct the output of the low-density area, some appropriate value is manually inputted to apply a low-density correction curve onto the low density area, the corrected image is outputted, an operator visually checks whether the outputted image is within an expected output range, and when it is not within the expected range the operator again inputs another correction value on which the operator have applied an appropriate change, then a re-corrected color is outputted and checked. These operations have been repeated until the outputted image falls at least within the expected range. These operations are time consuming and somewhat complicated, and since the input value is determined sensuously by the operator, it has been difficult to achieve optimal correction in a short time.

The present invention was conceived in view of these problems and the object thereof is to provide an apparatus and a method to stably output an image with proper gradation characteristic in low-density areas by automatically performing, in addition to the usual gamma correction, a low-density correction which corrects a low-density image, an image in a density area lower than mid-density areas, the low density image being difficult to correct with a usual gamma correction. Specifically, the object is to lessen the labor of the operator and to perform quick and exact corrections by applying a low-density correction curve to automatically adjust a rising position in the gradation curve and the gray balance in the low-density areas.

SUMMARY OF THE INVENTION

An embodiment reflecting one aspect of the present invention to solve the problems described above is an image forming apparatus, which includes: an outputting section to output a chart which comprises a gradation pattern in a low-density area, the gradation pattern including patches, each of the patches having a density; a reading section to read-in the density of each of the patches; a calculating section to calculate, based on the density, an adjusting value to conduct a gamma correction; and an output adjusting section to conduct an adjustment of an output in the low-density area based on the calculated adjusting value.

An embodiment reflecting another aspect of the present invention is the above-described image forming apparatus, wherein the output adjusting section conducts the gamma correction based on a gradation correction curve for totally correcting gradation characteristics, and on a low-density correction curve including the adjusting value as a parameter; and the calculating section extracts, from the density, a referential input value which is to be a reference for adjustment, receives a target value for adjustment, and calculates an offset value to adjust the output in the low-density area as the adjusting value, based on the referential input value and the target value by referring to the gradation correction curve and the low-density correction curve.

An embodiment, reflecting another aspect of the present invention, is an output correcting method for correcting an output image of an image forming apparatus based on a gradation correction curve to totally correct gradation characteristics of the image forming apparatus and a low-density correction curve to correct gradation characteristics in a low-density area, the output correcting method including the steps of: outputting a chart which comprises a gradation pattern in a low-density area, the gradation pattern including patches, each patch having a density; reading-in the density of each patch of the chart outputted; extracting, from the density, a referential input value which is to be a reference for an adjustment; receiving a target value for the adjustment; calculating an offset value for adjusting an output in the low-density area based on the referential input value and the target value by referring to the gradation correction curve; and adjusting the output in the low-density area based on the offset value for adjusting the output.

BRIEF DESCRIPTION OF THE DRAWINGS

These and other objects, advantages and features of the invention will become apparent from the following description thereof taken in conjunction with the accompanying drawings in which:

FIGS. 8(A)-(D) are charts for gray balance adjustment;

FIGS. 9(A-1)-(D-2) are graphs showing data analysis results of gray balance;

DETAILED DESCRIPTION OF THE PREFERRED EMBODIMENTS

Examples of the embodiments of this invention will be described in the following, with reference to the drawings.

First Embodiment

Figure 1:
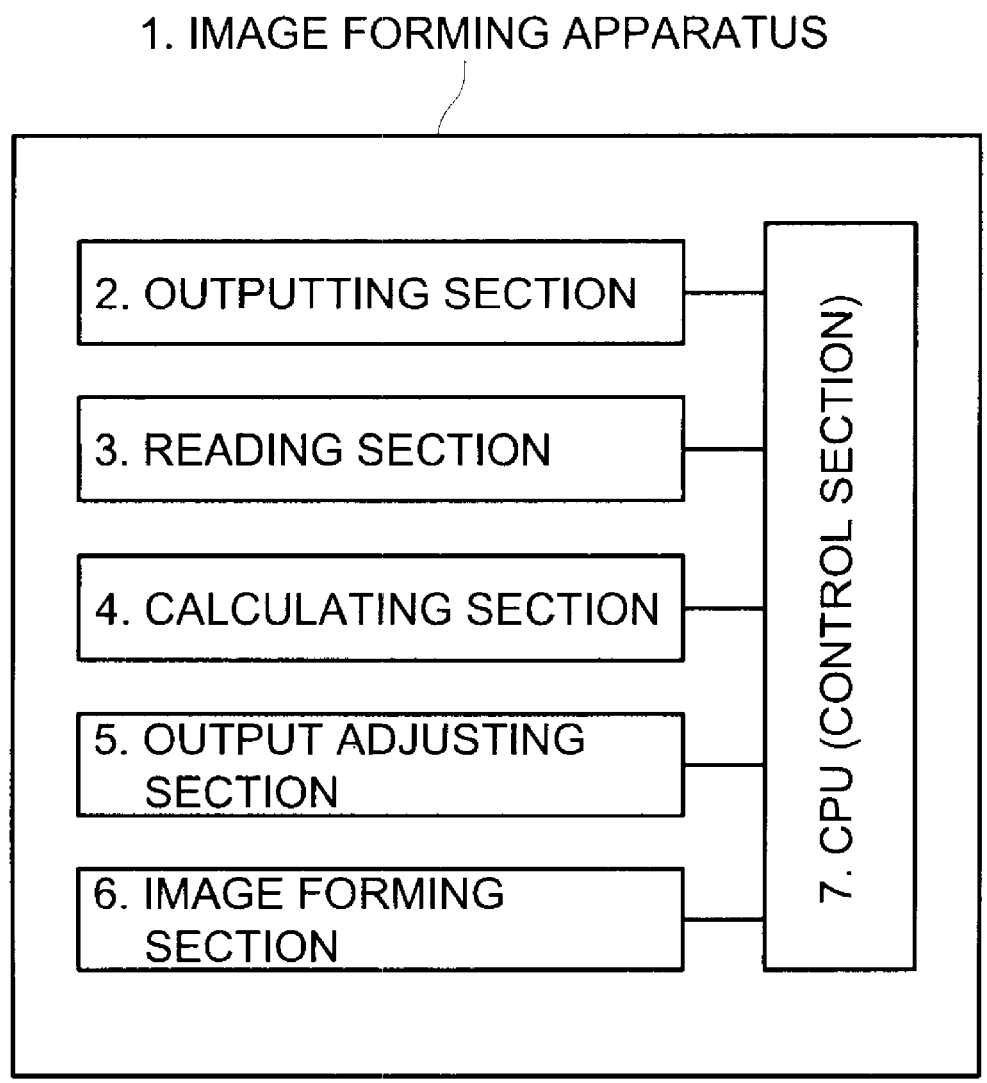
FIG. 1 is a block diagram of an image forming apparatus.
Figure 2:
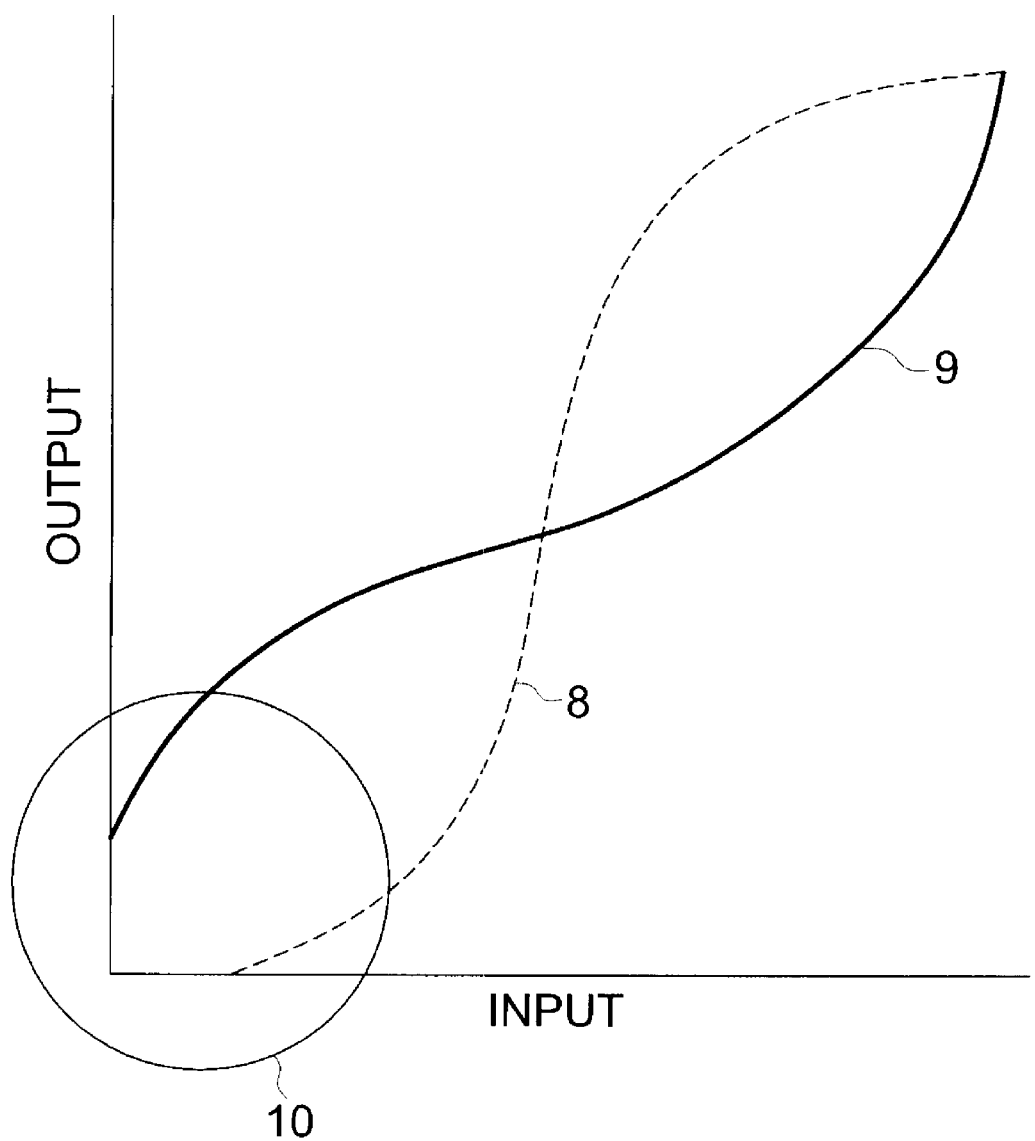
FIG. 2 is a graph showing a gradation characteristic of the image forming apparatus.
Figure 3:
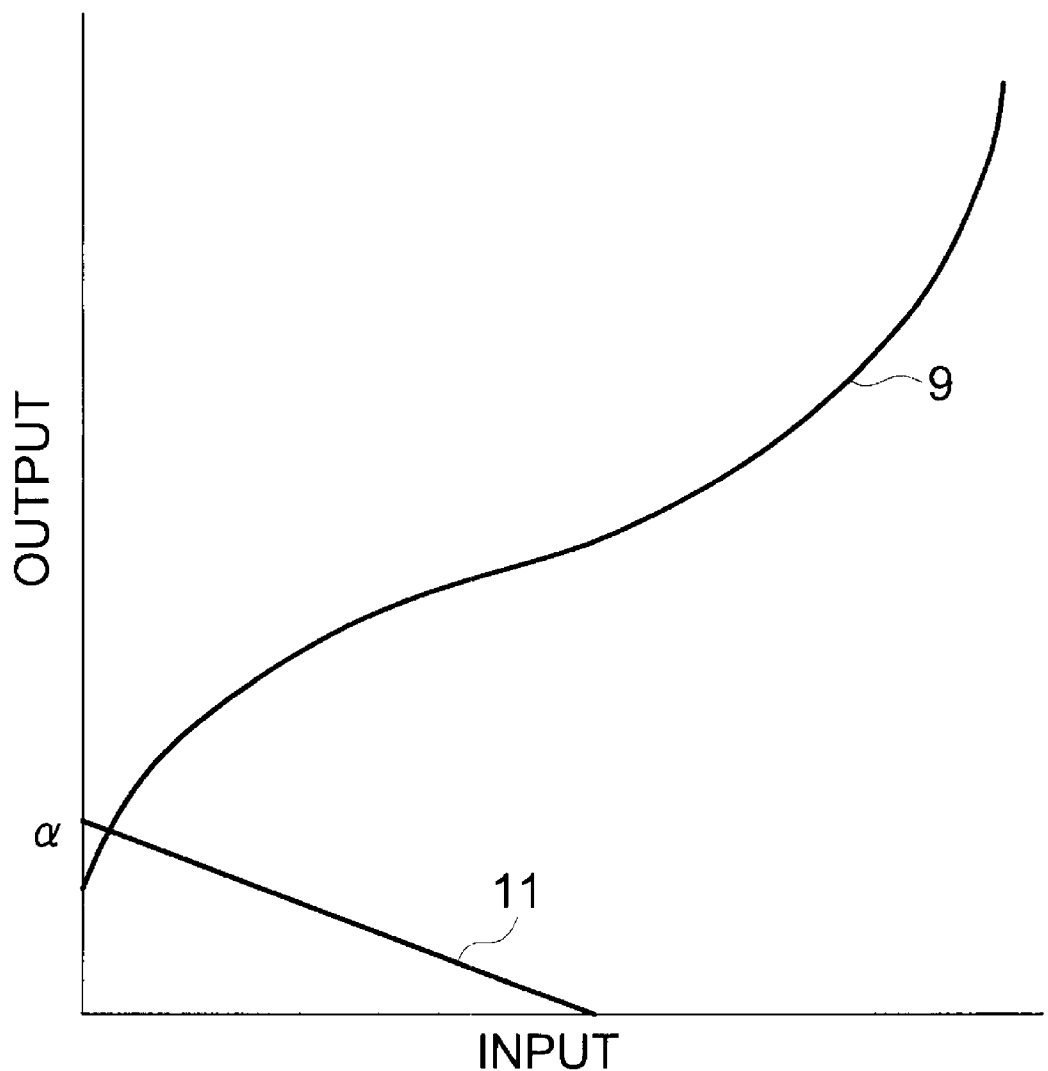
FIG. 3 is a graph collectively showing a gamma correction curve and a low-density correction curve.

FIG. 1 is a block diagram of an image forming apparatus, FIG. 2 is a graph showing a gamma characteristic (hereinafter may be called as a gradation characteristic), which is a subject of adjustment in the present invention, and FIG. 3 is a graph collectively showing a gamma correction curve and a low-density correction curve for correcting the low-density area. Herein, "adjustment" means to change an offset value or a gradient of the low-density correction curve.

As shown in FIG. 1, image forming apparatus 1 is provided with outputting section 2, reading section 3, calculating section 4, output adjusting section 5 and image forming section 6. Each of these sections is controlled by CPU 7 provided in the image forming apparatus. In FIG. 2, the horizontal axis shows input density of the patch to be reproduced by image forming apparatus 1, and the vertical axis shows the patch density actually read by reading section 3 corresponding to the input value in the horizontal axis. Further, gradation characteristic curve 8 shows the output of image forming apparatus 1 in a case of without correction, while gradation correction curve 9 shows a conventional gradation correction curve for conducting correction for all density areas of the output from image forming apparatus 1 exhibiting gradation characteristic curve 8. Low-density area 10 represents the area to be adjusted in the present invention. Axes in FIG. 3 respectively represent the same kind of values as those in FIG. 2, and low-density correction curve 11 represents a correction curve for correcting low-density area 10. Further, image forming apparatus 1 is capable of correcting an output image based on gradation correction curve 9 for totally correcting a gradation characteristic and based on low-density correction curve 11 for correcting an output in low-density area 10. Image forming apparatus 1 forms an image with image forming section 6, and characteristic of this image forming section 6 greatly affects gradation characteristic curve 8.

Figure 4:
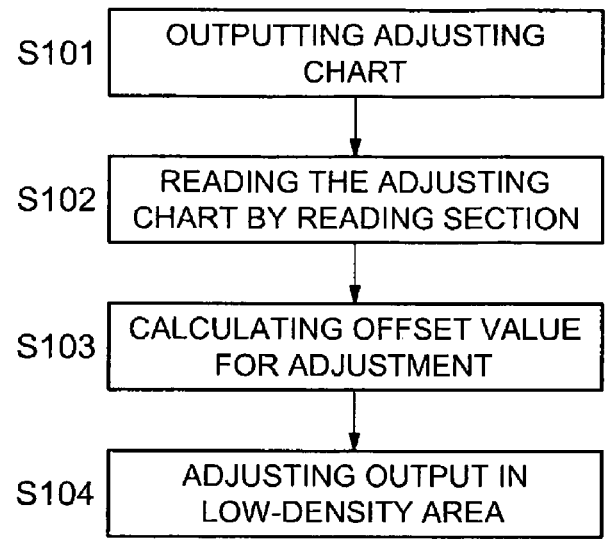
FIG. 4 is a flow chart of the first embodiment relating to the present invention.

Operations of image forming apparatus 1 in the first embodiment will be described below by referring to FIGS. 1, 4, and 5. Firstly, in step S01 in FIG. 4, outputting section 2 outputs a chart of a gradation pattern in low-density area 10. Next, in step S02 in FIG. 4, reading section 3 reads out each density of each of the patches outputted. By this, the output values directly reflecting a gradation characteristic before conducting an adjustment in low-density area 10 in FIG. 2 can be read-in. In step S03 in FIG. 4, calculating section 4 extracts, from the density read-in by reading section 3, an input value of the patch having desired output value as a referential input value which is to be a reference for adjustment. Further, calculating section 4 receives a target value for adjustment and calculates an offset value of low-density correction curve 11 such that the output value after adjustment corresponding to the target value becomes the same as the output value before adjustment corresponding to the referential input value. As the means for receiving the target value, an operator may previously input a value, a fixed value may be set previously, or a value may be read in via a network. In the present embodiment the means whereby the operator inputs the data previously is adopted.

By referring to FIG. 5, a calculating method for the adjusting value by calculating section 4 will be described. The horizontal axis of FIG. 5 represents input values of the patch data and the vertical axis represents the actual output values corresponding to the input values. The curve in the graph is gradation correction curve 9, straight line 111 represents a low-density correction curve before adjustment and straight line 112 represents a low-density correction curve after adjustment. In order that the effect of the adjustment in low-density area 10 does not affect the high-density area, the low-density correction curves are set to contact the horizontal axis at the input value of 128. However other values may be adopted as the contact point. In order to enable the adjustment of low-density curve 11 by varying the adjusting value a for offsetting, low-density correction curve 11 is represented by the formula: $y=-\{\alpha/(n/2)\} \times +\alpha$. where, n represents the maximum value of gradation number, and n=255 in the present embodiment. In the first adjustment, since straight line 111 is not applied before the adjustment, the offset is zero. As shown in FIG. 5, the referential input value for adjusting the low-density correction is set to be A', an output value outputted from image forming apparatus 1 corresponding to input value A' before adjusting low-density correction curve 11 is set to be B'+C', the target value is set to be A, and the output value outputted from image forming apparatus 1 corresponding to input value A after adjusting low-density correction curve 11 is set to be B+C. Under these conditions, the adjusting value for offsetting the low-density correction curve 11 is adjusted such that B'+C' equals to B+C.

Thereafter, in step S04, output adjusting section 5 adjusts the output in low-density area 10 based on the adjusting value $\alpha$.

By this procedure, an adjusting offset value can be obtained for outputting the output value before adjustment, corresponding to the referential input value with respect to the target input value, and desired correspondence of the input value and the output value is enabled, which ensures appropriate correction in the low-density area.

In the present embodiment as a preferable way to obtain a proper output through the correction of low-density area 10 by adjusting the low-density correction curve, in the adjustment of low-density correction curve 11, the referential input value is set to the rising position indicating the value where color density starts to rise.

Hereinafter, a specific method of adjusting low-density correction curve 11 will be described in the case of adjusting the rising position with the reference of FIGS. 5, 6, and 7.

Figure 5:
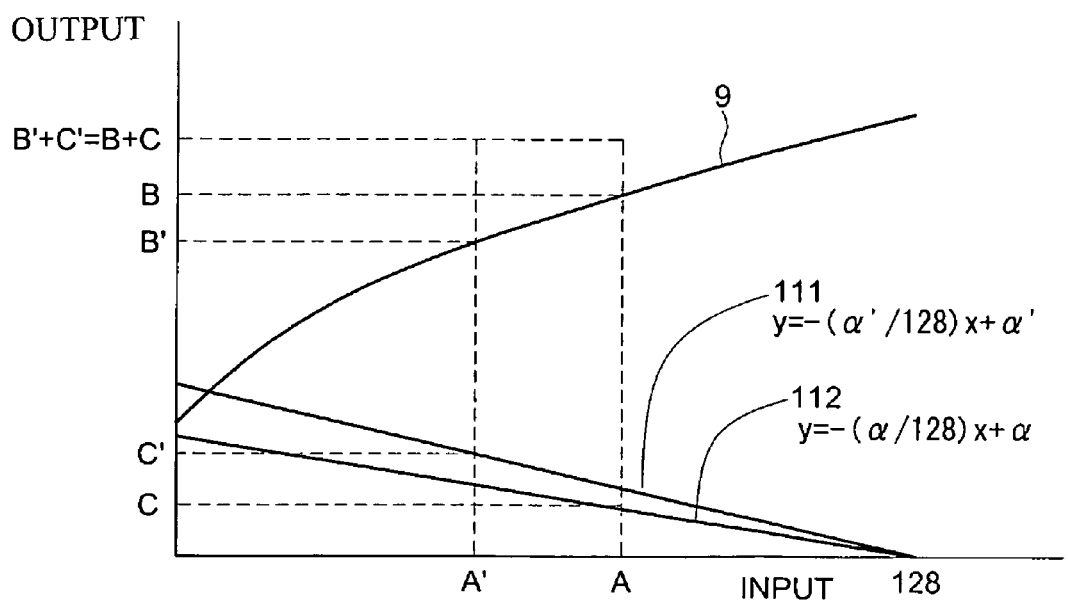
FIG. 5 is an explanation chart for explaining a method of calculating the adjusting value.
Figure 6:
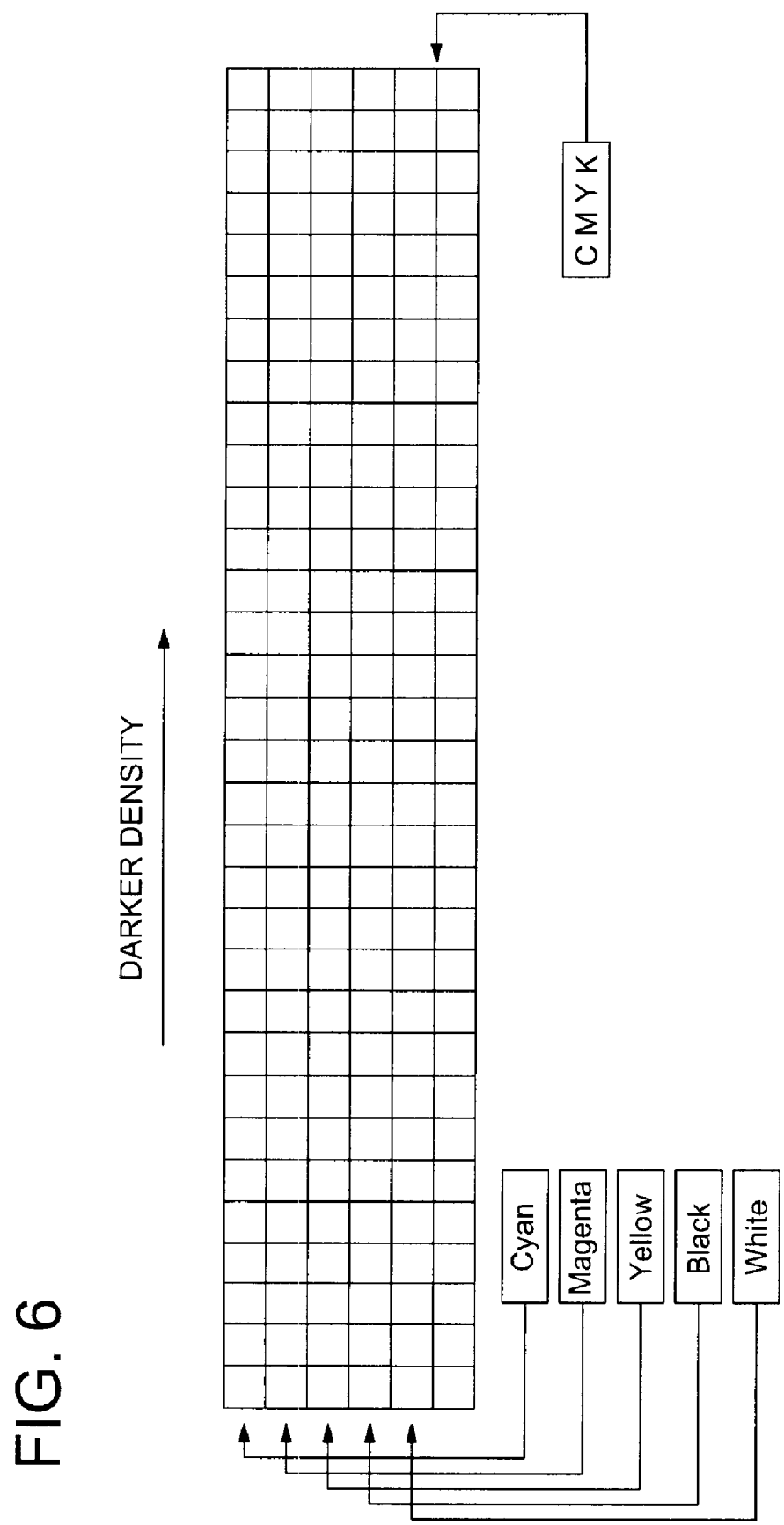
FIG. 6 is a chart for adjusting a rising position.
Figure 7:
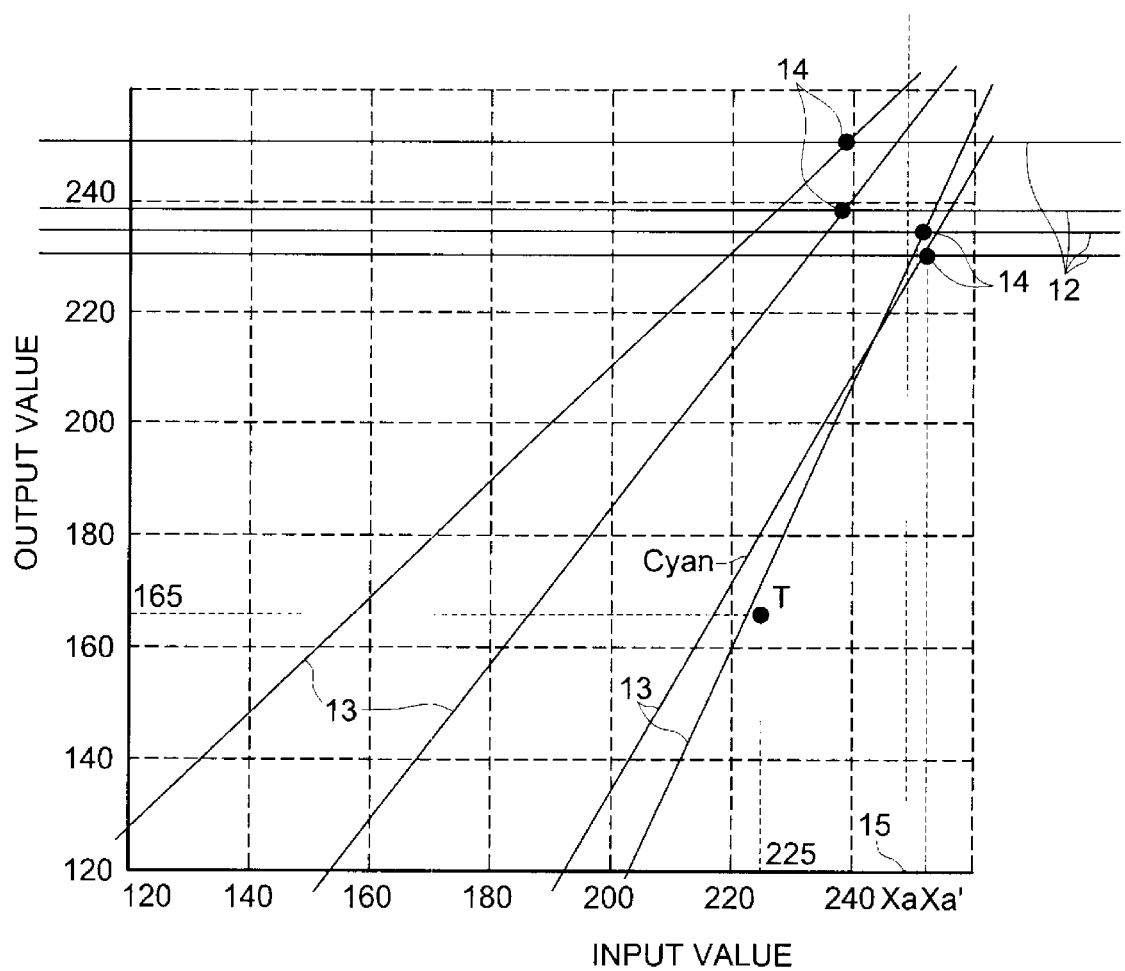
FIG. 7 is a graph showing input values and measured output values of RGB brightness.

FIG. 5 is an explanation chart for explaining a method of calculating the adjusting value, FIG. 6 is a chart for adjusting a rising position, and FIG. 7 is a graph showing results of analysis of read-in data.

Firstly the chart shown in FIG. 6 for adjusting the rising position is formed by image forming section 6, and outputted by outputting section 2. The outputted chart has patches with gradation patterns. Reading section 3 reads out patch data including output value of each patch density (please refer to FIG. 1). Though the chart is not illustrated in detail in FIG. 6, the chart is actually a color chart in which the patch arranged at the righter side exhibits the higher density. Here, the patch data of C M Y K values are calculated at the image channel of corresponding R G B values. In the image channels where read-in values of C M Y K correspond to respective channels, Cyan corresponds to Red, Magenta to Green, Yellow to Blue and Black corresponds to Green. This is why, for example, Cyan density changes according to absorption value of Red from white. As for Black, Green is allocated which represents the widest dynamic range.

Next, a data analyzing method will be described in detail with referring to FIG. 7. The horizontal axis represents the input value of a patch (the value before the image formation by image forming section 6, this value may be a previously set value or an inputted value), while the vertical axis represents the output value of the patch actually read-in by reading section 3. Namely, FIG. 7 shows input-output characteristics for the patches with respect to the image forming apparatus including image forming section 6. Values of the patch data calculated as R G B brightness values are plotted on the graph. For example, point T represents the point of patch data of input value 225 and output value 165. Line 12, extending parallel with the axis of the input value, represents a white reference of each color. The white reference is basically made by plotting the data read-in of white patches in the second line from the bottom of FIG. 6, and by connecting the plotted points. However, since brightness value of chart sheet varies by places according to the influence of image brightness gradient, the average value of the white patches is defined to be the white reference in the present embodiment. Next, in order to avoid any influence from the error of higher density side, approximation line 13 is obtained by a least-square method with utilizing data of 10 patches from the point represented on the graph, which have lower R G B brightness values (are darker) by at least a value of 2 from the white reference on the graph. Thus, the crossing point of the approximation line and the white reference line represents the value indicating where color density starts to rise on the paper (rising position 14) before the adjustment. Further, rising position 14 of each color of C M Y K before the adjustment is read-in. Here, as an example, rising position 14 of Cyan before the adjustment is assumed to be Xa, and target value 15 is assumed to be the position desired to be the rising position after the adjustment. Target value 15 is usually set to be nearly 250. In FIG. 7, Xa represents target value 15.

Next, the method of calculating the adjusting value from the data obtained through the above procedure will be described in detail with reference to FIG. 5. With regard to the relationship between FIG. 5 and FIG. 7, the value created by subtracting the input value of FIG. 7 from maximum input value "n" of gradation equals the input value of FIG. 5. In the present embodiment, n=255. Firstly, an input value before adjustment and the target value are calculated from R G B brightness value data having been previously obtained. In this case, the input value before adjustment is A'=255−Xa', and the target value is A=255−Xa. Then, by utilizing this value, the corrected output value corresponding to the input value before adjustment A' is calculated. In FIG. 5, the output value corrected with the gradation correction curve 9 corresponding to input value A' is assumed to be B'. Since gradation correction curve 9 is previously set, output value B' can be calculated. Since the correction with the low-density correction curve 11 is further applied, and the value of straight line 111 corresponding to A' is C', the actual output value becomes B'+C'. Accordingly, output value B'+C' corresponding to input value A' at the present rising position can be calculated. However, at the time of first adjustment, since straight line 111 is not applied before adjustment, offset remains zero and the output value is B'.

Next, straight line 112 which is the low-density correction curve after adjustment is determined such that the output value corresponding to the target value becomes the output value corresponding to the input value at the present rising position. In the example shown in FIG. 5, α is determined such that the output value corresponding to the target value A becomes B'+C'. Here, the output value corrected with gradation correction curve 9, corresponding to target value A, is B. Further, in the present embodiment n=255. Therefore, a can be calculated from the equation of: $B+\{-(\alpha/128)A+\alpha\}=B'+C'$. Accordingly, desired straight line 112, which being the low-density correction curve for correcting low-density area 10 can be calculated, and by adding this straight line 112 onto gradation correction curve 9, the correction curve after adjustment can be obtained.

By applying the obtained gamma correction curve to the gradation characteristic of FIG. 2, a gradation curve approximating the straight line having a gradient of 1 and passing the point of origin can be formed. Accordingly, an appropriate rise in gradation can be realized in low-density area 10.

Second Embodiment

The second embodiment relating to the present invention will be described by referring to FIGS. 5, 8(A)-(D), and 9(A-1)-(D-2). FIG. 5 is an explanation chart for explaining a method of calculating the adjusting value, FIGS. 8(A)-(D) are charts for gray balance adjustment, while FIGS. 9(A-1)-(D-2) are graphs showing analysis results of gray balance data. In the present embodiment, the referential input value is set to be a referential gray value in low-density area 10, with respect to the image forming apparatus of the first embodiment.

The second embodiment has almost similar configuration to that of the first embodiment, however differently from the first embodiment, the second embodiment conducts the adjustment of low-density correction curve 11 based on gray balance adjustment, in the process of obtaining an appropriate output by performing correction in low-density area 10 through the adjustment of the low-density correction curve 11.

In the first place, outputting section 2 outputs the gray balance chart shown in FIGS. 8(A)-8(D), and reading section 3 reads-out the outputted chart to obtain C M Y K data for each patch (please refer to FIG. 1). Here, similarly to the first embodiment, the obtained patch data of C M Y K values are converted by utilizing the image channels of corresponding R G B values to calculate patch data of corresponding R G B brightness values.

Here, the gray balance adjusting chart shown in FIGS. 8(A)-8(D) will be explained. Four 7 by 7 gradation patterns are arranged in each chart. In each pattern, Cyan density is fixed, Yellow density becomes darker as it moves more downward in the vertical direction, and Magenta density becomes darker as it moves more rightward in the horizontal direction, each of Yellow density and Magenta density varies over seven steps. In the order of FIG. 8(A), FIG. 8(B), FIG. 8(C) and FIG. 8(D), Cyan densities of the gradation pattern become darken. In this regard, since the gradation patterns are for conducting the adjustment in low-density area 10, they are gradation patterns with low-densities. Each of the 7 by 7 patterns are formed such that the C M Y K value at the center position of the pattern becomes the output value, respectively corresponding to the input values of Yellow Magenta=Cyan. Therefore, the condition, where the output values at the center position being nearest to the standard gray having no color bias (namely Yellow=Magenta=Cyan), is assumed to be the gray-balanced condition.

Next, the analyzing method of the data will be described in detail. Firstly, the calculated patch data of R G B values are converted to L* a* b* values by utilizing a conversion table such as 3DLUT (3 Dimension Look Up Table). Next, in the L* a* b* space, the value obtained by converting the output corresponding to input value 128 into the L* a* b* value and the value obtained by converting the output corresponding to input value 0 (zero) into the L* a* b* value are connected with a line, and this line is taken as to be the referential gray line. Then, the distance between each patch data, obtained by reading-out the printed chart and the referential gray line is calculated. The calculated values are expressed on the 7 by 7 charts, which are same as the read-in gradation pattern. These are shown in FIGS. 9(A-1), 9(B-1), 9(C-1) and 9(D-1).

FIGS. 9(A-1)-9(D-2) will be now explained. The 7 by 7 graphs of FIGS. 9(A-1) (A-2), 9(B-1) (B-2), 9(C-1) (C-2), and 9(D-1) (D-2) are respectively corresponding to the 7 by 7 gradation patterns of FIGS. 8(A), 8(B), 8(C), and 8(D). Further, in FIGS. 9(A-1), (B-1), (C-1), and (D-1), points where the distances from the referential gray line are equal with each other are connected, and, large/small of the distances are expressed by light/dark colors in the graphs. Namely, the position of darkest color (black) represents the position where the distance from the referential gray line is smallest, and as the color gets lighter the distance gets larger.

Then, the nearest 4 patches from the referential gray line are extracted. These extracted patches are shown in FIGS. 9(A-2), (B-2), (C-2), and (D-2). Further, the point where the distance from the gray balanced point becomes smallest is obtained, by using the three nearest points from the referential gray line among the extracted points expressed in FIGS. 9(A-2), (B-2), (C-2), and (D-2), and by weighting the distance between each point and the referential gray line to obtain the weighted center. This obtained point becomes the referential gray point.

The calculation method of the adjusting value from the above-obtained data will be explained with reference to FIG. 5. The general outline of the adjustment is such that the output value corresponding to the input value at the center of the 7 by 7 gradation patterns is adjusted to be equal to the present output value corresponding to the input value at the obtained weighted center. As an example, in FIG. 5, the value at the center of FIG. 8(A)(Cyan=Magenta=Yellow) is assumed to be target value A, and the input value at the referential gray position is assumed to be A'. After that the adjusting value of low-density correction curve 11 is calculated via calculation similar to that in the first embodiment.

By adjusting the output in the low-density correction area based on the obtained adjusting value, an output, adjusted by the correction curve approximated to the straight line having a gradient of 1 and passing the point of origin, can be obtained. Thereby, the gray balance in low-density area 10 can be maintained.

Third Embodiment

The third embodiment relating to the present invention will now be explained. The third embodiment has a configuration almost similar to that of the first embodiment, however differently from the first embodiment, in the process of adjusting low-density correction curve 11 for image forming apparatus 1, the third embodiment enables both adjustment of rising position and adjustment of gray balance.

In the present embodiment, firstly the rising position adjustment is conducted with a procedure similar to that in the first embodiment, and then gray balance adjustment is conducted with a procedure similar to the second embodiment. Accordingly, a stable rise of gradation and maintenance of an approximate gray balance can be realized.

Further, in the present embodiment, in the case of conducting both adjustments, it may be laborious to output respective charts, therefore, a single chart combined with the rising position adjusting chart and the gray balance adjusting chart may be utilized.

Fourth Embodiment

The fourth embodiment relating to the present invention will be explained below. The fourth embodiment has almost a similar configuration to those of the first through third embodiments, however differently from the first through third embodiment, patterns of the chart to be outputted from outputting section 2 for adjusting the gradation characteristic are randomly arranged.

Figure 10:
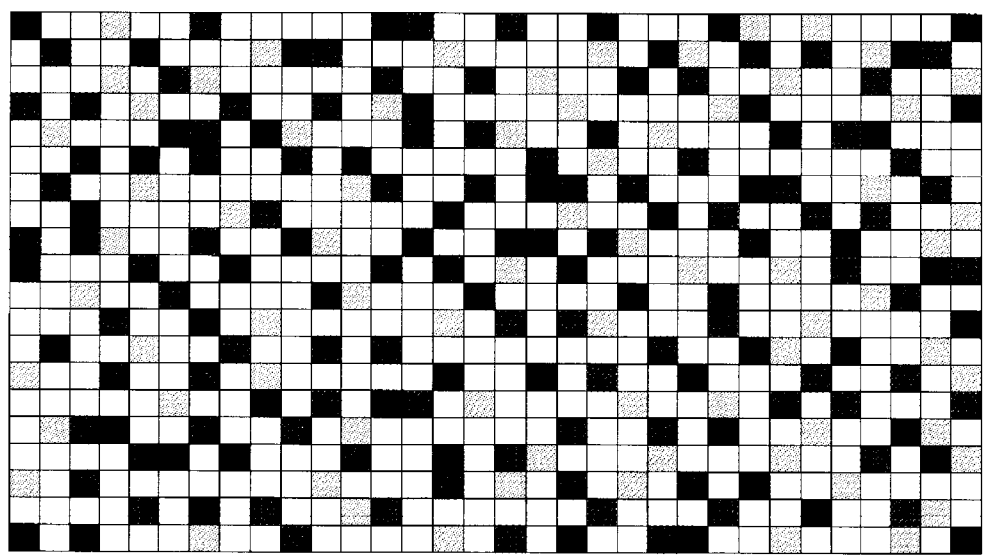
FIG. 10 is a chart for adjusting a rising position and a gradation, wherein patches being randomly arranged.

FIG. 10 shows an example of the chart to be outputted in the present embodiment. Though not expressed in the figure, this chart is a color chart. In this single chart, randomly arranged are: each patch of Cyan, Magenta, Yellow, and Black that forms the rising position adjusting chart shown in FIG. 6, each patch of gray gradation pattern that forms the gray balance adjusting chart shown in FIG. 8, and further, plural white patches.

In cases where patches are regularly arranged on a sheet of paper, patches of a particular density area are grouped in particular portion on the sheet, which may result in that influence of sheet face characteristic affects to the patches of a particular density area. However by randomly arranging each density patch, all density patches are outputted evenly on the whole sheet, thus the patches of a particular density area will not be affected by influence of the sheet face characteristics. Accordingly, more exact measurement of the output value can be performed, and by utilizing the exactly measured output value to adjust low-density correction curve 11, more accurate correction can be achieved.

Further, in the present embodiment, it is possible to arrange all the patches so that two of every patch are arranged separately and randomly on a single chart. Specifically, two sets of each patch composing the rising position adjusting chart of FIG. 6, and each patch composing the gray balance adjusting chart, shown in FIG. 8 are prepared, and by adding plural white patches, all the prepared patches are arranged randomly on a single chart. Accordingly, since two of the same density patches are arranged at different positions with each other on the chart, any influence of sheet face characteristics can be further suppressed.

Fifth Embodiment

The fifth embodiment relating to the present invention will be explained below with reference to FIGS. 11 and 12. The fifth embodiment has an almost similar configuration to those of the first through third embodiments, however differently from the first to third embodiment, in the fifth embodiment the adjusting operations are repeated until the adjusted output falls into an allowable range of the output value corresponding to the target value.

Figure 11:
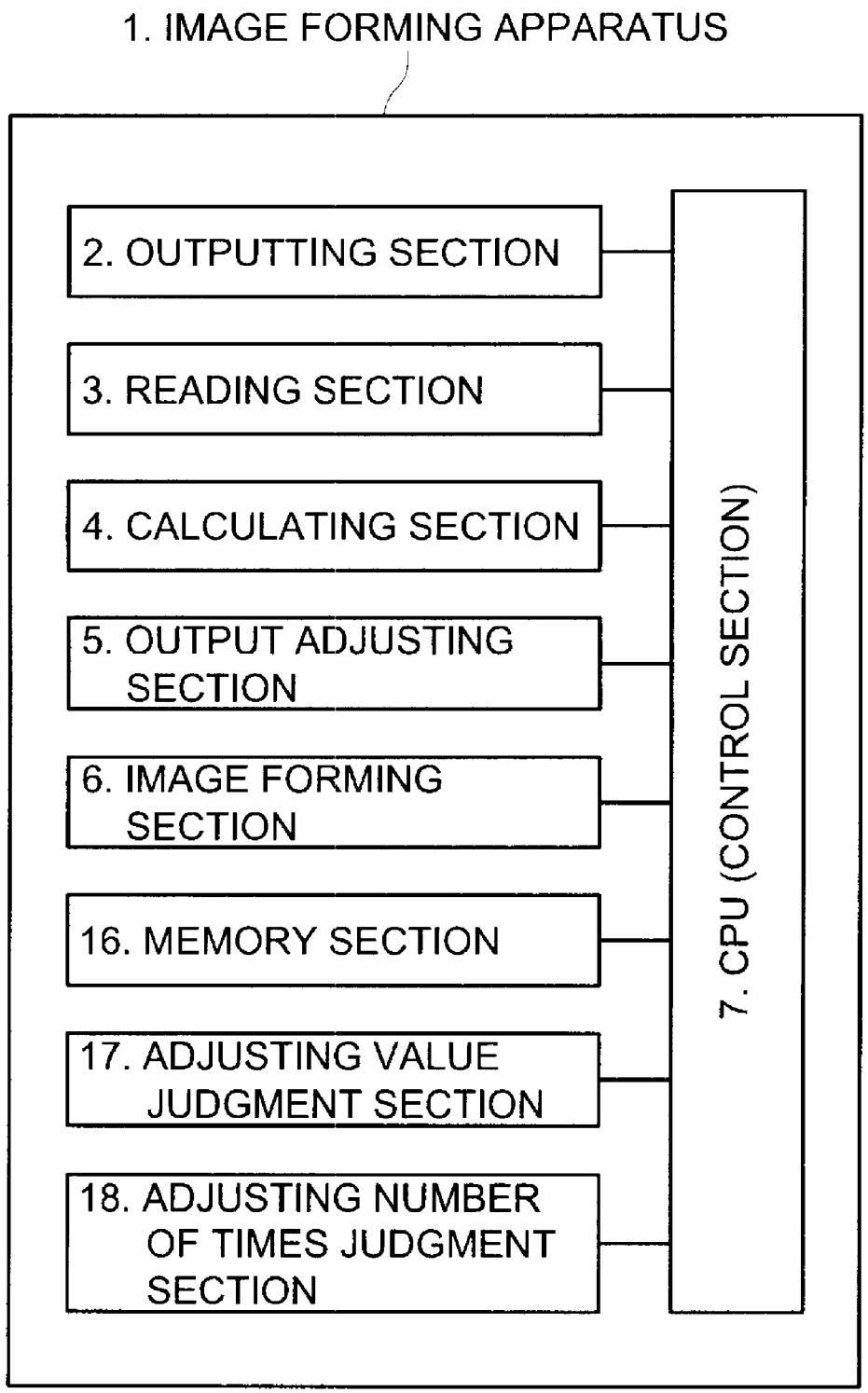
FIG. 11 is a block diagram showing an image forming apparatus of the fifth embodiment relating to the present invention.
Figure 12:
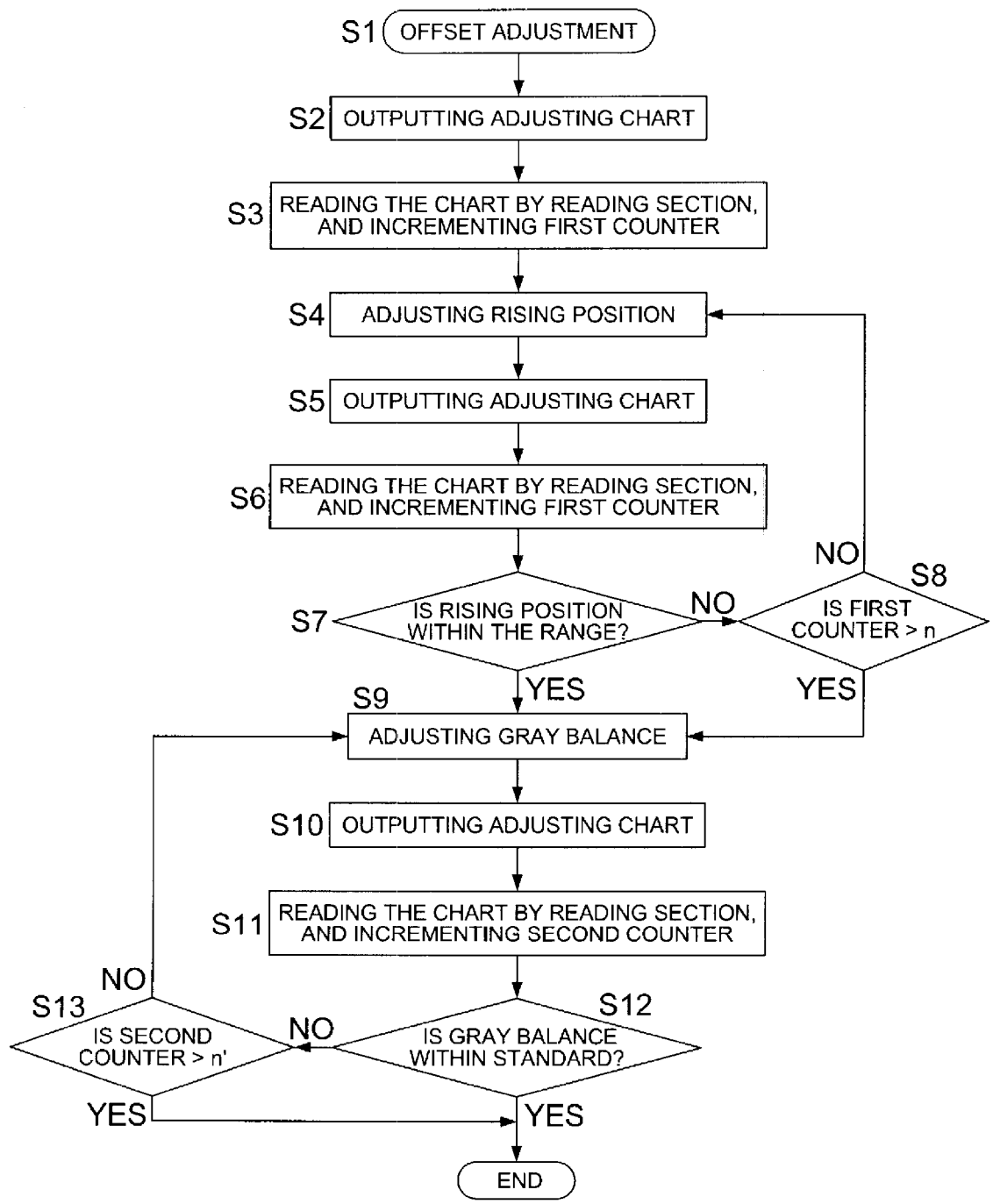
FIG. 12 is a flow chart of the fifth embodiment relating to the present invention.

As shown in FIG. 11, image forming apparatus 1 of the present embodiment is provided with outputting section 2, reading section 3, calculating section 4, output adjusting section 5, image forming section 6, memory section 16, adjusting value judgment section 17, and adjustment number of times judgment section 18. Each of these sections is controlled by CPU 7. Memory section 16 memorizes the allowable range of the adjusted output for the value outputted when the target value is inputted. Adjusting value judgment section 17 judges whether the output falls within the allowable range for the adjusted output. Further, the adjustment number of times judgment section 18 judges whether the adjustment of the low-density correction curve is carried out more than the number of times set as an upper limit number of times, by incrementing the counter every time of adjusting the low-density correction curve.

The procedure flow of the present embodiment will now be described while referring to the flow chart of FIG. 12. Firstly, in steps S1 to S4, first rising position adjustment is performed similarly to the first embodiment, while in step S3 a first counter of the adjustment number of times judgment section 18 is incremented. Next, in step S5 the adjusting chart is outputted from outputting section 2 of image forming apparatus 1 in which the correction has been applied with adjusted low-density correction curve 11. In step S6, reading section 3 again reads-out the adjusting chart, and the first counter of the adjustment number of times judgment section 18 is incremented. Next, in step S7, adjusting value judgment section 17 judges whether the rising position of the read-in data falls within the range of the desired rising position of the patches.

Now, described will be cases where the rising position is outside the allowable range as the result of the judgment. In this case, firstly judged in step S8 is whether the value of the first counter is greater than set value "n". In the case of not greater than the set value, in step S4 the rising position adjustment is performed similarly to the first embodiment, in step S5 the adjusting chart is outputted, and in step S6 the adjusting chart is read-in again, while the first counter is incremented. Further, in step S7 judged is whether the rising position is within the allowable range, and if not, a similar adjustment is repeated, while the counter is incremented.

Accordingly, the rising position adjustment is repeated, and when in step S8 the counter exceeds the previously set threshold value, the rising position adjustment is finalized to move on to the gray balance adjustment.

Next to be described will be a case where the result of the judgment the rising position is within the allowable range. In such case, in step S9 gray balance adjustment is performed similarly to the second embodiment by utilizing the data read-in from the adjusting chart. Next, in step S10, the adjusting chart is outputted from outputting section 2 of image forming apparatus 1 in which the correction has been applied with gray balance adjusted low-density correction curve 11.

In step S11, reading section 3 again reads-out the adjusting chart, and a second counter of the adjustment number of times judgment section 18 is incremented. Then, in step S12, adjusting value judgment section 17 judges whether the output value falls within the desired standard value range of the gray balance.

When the output value is out of the standard range, in steps S9 through S11 by utilizing the adjusting chart read-in, the gray balance adjustment is repeated, and the counter is incremented, whereas when the output is within the standard range, the adjustment is finished in step S14. Also, in this case, when the counter exceeds previously set threshold value n, gray balance adjustment is finalized.

In the present embodiment, after the rising position has settled within the desired region, the gray balance adjustment is conducted and judged is whether the output value falls within the standard range of gray balance. However, considering possible cases where the adjustment of rising position and the gray balance adjustment are not simultaneously achieved, an arrangement is possible where the gray balance judgment in steps S10 to S13 is skipped, and the adjustment procedure is finalized in step S14 after step S9 is finished.

According to an embodiment of the present invention, an output of low-density area can be automatically adjusted by utilizing density data read from an outputted chart composed of gradation patterns in the low-density area, without causing troubles of an operator. By this, the operator's laborious work to determine the correcting values by observing the outputted chart and judging likely proper correcting value to input them into the image forming apparatus can be saved.

According to another embodiment of the present invention, the process of analyzing the read-in data from the outputted chart composed of gradation patterns in the low-density area, calculating the adjusting values for the low-density correction curve, calculating the values applied with the low-density correction curve adjusted by the adjusting values, and applying the correcting values into the image forming apparatus can be performed without causing additional operator work. By this, not only laborious operator work to determine likely correcting values by observing the outputted chart, and to input such data into the image forming apparatus can be cut out, but also a particular effect of enabling the appropriate gamma correction can be attained.

According to still another embodiment of the present invention, it becomes possible to conduct the rising position adjustment in low-density areas without causing operator laborious work. Due to this, the laborious work of the operator to sensuously input the gray balance adjusting values for the rising position can be saved.

According to yet another embodiment of the present invention, it becomes possible to conduct gray balance adjustment in low-density area without causing operator laborious work. Whereby, the laborious work of the operator to sensuously input the gray balance adjusting values can be saved.

According to still another embodiment of the present invention, since the input value at the rising position before adjustment and the target value are quantitatively indicated, and the adjusting value for the rising position is calculated based on the difference of the input values, more accurate adjustment can be performed than in the case of determining the adjusting value with a sense of an operator. Due to this, a particular effect of enabling speedy and exact correction with rising position adjustment can be attained.

According to still another embodiment of the present invention, since the present input value at a referential gray position and the target value are quantitatively indicated, and the adjusting value for the gray balance is calculated based on the difference of the input values, more accurate adjustment can be performed than the case of determining the adjusting value with a sense of the operator. Due to this, a particular effect of enabling speedy and exact correction with gray balance adjustment in the low-density area can be attained.

According to still another embodiment of the present invention, it can be possible to conduct both the rising position adjustment and the gray balance adjustment in the low-density area in the image forming apparatus. Due to this, the specific effect of enabling the gradation adjustment can be attained, which satisfies both adjustments without causing degraded gray balance due to the rising position adjustment, or shifted rising position due to the gray balance adjustment.

According to yet another embodiment of the present invention, since patterns of the chart to be read-in for the gradation adjustment are randomly arranged on a sheet, reduced can be the influence of characteristics of the sheet affecting on the outputted patches of the chart, such as causing the density differences depending on the location where the patch image is arranged on the sheet. Due to this, the specific effect of enabling to obtain the precise data while suppressing the influence of differing sheet characteristics can be attained.

According to still another embodiment of the present invention, when conducting gradation characteristic adjustment, by repeating the adjustment until the gradation characteristics are adjusted within the desired range, sure adjustment of gradation characteristic can be possible, as well as preventing infinite adjustment repetitions. Due to this, the specific effect of enabling to conduct precise gradation characteristic adjustment within reasonable number of times of repetitions can be attained.

What is claimed is:

1. An image forming apparatus comprising:
an outputting section to output a chart which comprises a gradation pattern in a low-density area, the gradation pattern including patches, each of the patches having a density;
a reading section to read-in the density of each of the patches for obtaining an input-output characteristics;
a calculating section to calculate an adjusting value to adjust the output in the low-density area of a low-density correction curve, wherein the low-density correction curve has output values corresponding only to input values of not greater than a half of maximum input value of a gradation correction curve; and
an output adjusting section to conduct an adjustment of an output in the low-density area based on a the gradation correction curve for totally correcting gradation characteristics, and on the low-density correction curve including the adjusting value as a parameter,
wherein the calculating section extracts, from the input-output characteristics, a referential input value corresponding to an input value where a color density starts to rise in a gradation of the low-density area, receives a target input value regarding the input value where the color density starts to rise, and calculates an offset value to adjust the output in the low-density area as the adjusting value, so as to satisfy a relation of:

$B'+C'=B+C;$ where B' represents an output value when the referential input value is inputted to the gradation correction curve,
C' represents an output value when the referential input value is inputted to the low-density correction curve before applying the adjusting value,
B represents an output value when the target input value is inputted to the gradation correction curve, and
C represents an output value when the target input value is inputted to the low-density correction curve after applying the adjusting value.

2. An image forming apparatus comprising:
an outputting section to output a chart which comprises a gray gradation pattern including patches, each of the patches having a density;
a reading section to read-in the density of each of the patches for obtaining an input-output characteristics;
a calculating section to calculate an adjusting value to adjust the output in a low-density area of a low-density correction curve; and
an output adjusting section to conduct an adjustment of an output in the low-density area based on a gradation correction curve for totally correcting gradation characteristics, and on the low-density correction curve including the adjusting value as a parameter,
wherein the calculating section extracts, from the input-output characteristics, a referential input value corresponding to a position where a distance from the referential gray position being minimum, receives an target input value for adjusting gray balance as a target value, and calculates an offset value to adjust the output in the low-density area as the adjusting value, so as to satisfy a relation of: $B'+C'=B+C$
where B' represents an output value when the referential input value is inputted to the gradation correction curve,
C' represents an output value when the referential input value is inputted to the low-density correction curve before applying the adjusting value,
B is an output value when the target input value is inputted to the gradation correction curve, and
C represents an output value when the target input value is inputted to the low-density correction curve after applying the adjusting value.

3. The image forming apparatus of claim 1, wherein the chart comprises a random pattern in which plural patches are randomly arranged.

4. The image forming apparatus of claim 1, further comprising:
a memory section to memorize an allowable range of the output value corresponding to the target value; and
an adjusting value judgment section to read-in an image outputted through the correction after the adjustment, and judge whether an output of the image read-in falls within the allowable range of the output value corresponding to the target value, and finalize the adjustment when the output falls within the allowable range.

5. The image forming apparatus of claim 4, wherein when the adjusting value judgment section judges that the output falls out of the allowable range, the adjustment is conducted again,
wherein the image forming apparatus further comprises an adjustment number of times judgment section which finalize the adjustment when adjustment number of times exceeds a preset upper limit.

6. An output correcting method of an image forming apparatus for correcting an output image based on a gradation correction curve to totally correct gradation characteristics of the image forming apparatus and a low-density correction curve to correct gradation characteristics in a low-density area, wherein the low-density correction curve has output values corresponding only to input values of not greater than a half of maximum input value of a gradation correction curve, the output correcting method comprising the steps of:

outputting a chart which comprises a gradation pattern in a low-density area, the gradation pattern including patches, each patch having a density;

reading-in the density of each patch of the chart outputted, for obtaining an input-output characteristics;

extracting, from the input-output characteristics, a referential input value corresponding to an input value where a color density starts to rise in a gradation of the low-density area;

receiving a target input value regarding an input value where the color density starts to rise;

calculating an offset value for adjusting an output in the low-density area, as an adjusting value of the low-density correction curve, so as to satisfy a relation of:

$$B'+C'=B+C$$

where B' represents an output value when the referential input value is inputted to the gradation correction curve, C' represents an output value when the referential input value is inputted to the low-density correction curve before applying the adjusting value, B represents an output value when the target input value is inputted to the gradation correction curve, and C represents an output value when the target input value is inputted to the low-density correction curve after applying the adjusting value; and adjusting the output in the low-density area based on a the gradation correction curve for totally correcting gradation characteristics, and on the low-density correction curve including the adjusting value as a parameter.

7. The output correcting method of claim 6, further comprising the steps of:

outputting second chart comprising a gradation pattern in the low-density area, after the step of adjusting the output; and judging, after reading-in the second chart outputted, whether a read-in value falls within an allowable range of the output value corresponding to the target value memorized previously.

8. The output correcting method of claim 7, further comprising the steps of:

finalizing the adjustment when the read-in value is judged to fall within the allowable range;

re-adjusting the output value by repeating the calculating step, the outputting second chart step, and the judging step, when the read-in value is judged to fall out of the allowable range; and finalizing the adjustment when an adjustment number of times exceeds a preset upper limit.

9. The output correcting method of claim 6, wherein the chart comprises a random pattern in which plural patches are randomly arranged.

10. An output correcting method of an image forming apparatus for correcting an output image based on a gradation correction curve to totally correct gradation characteristics of the image forming apparatus and a low-density correction curve to correct gradation characteristics in a low-density area, wherein the low-density correction curve has output values corresponding only to input values of not greater than a half of maximum input value of a gradation correction curve, the output correcting method comprising the steps of:

outputting a chart which comprises a gray gradation pattern, the gradation pattern including patches, each patch having a density;

reading-in the density of each patch of the chart outputted, for obtaining an input-output characteristics;

extracting, from the input-output characteristics, a referential input value corresponding to a position where a distance from the referential gray position being minimum, receiving an objective input value for adjusting gray balance as a target input value;

calculating an offset value for adjusting an output in the low-density area as an adjusting value of a low-density correction curve, so as to satisfy a relation of:

$$B'+C'=B+C$$

where B' represents an output value when the referential input value is inputted to the gradation correction curve, C' represents an output value when the referential input value is inputted to the low-density correction curve before applying the adjusting value, B represents an output value when the target input value is inputted to the gradation correction curve, and C represents an output value when the target input value is inputted to the low-density correction curve after applying the adjusting value; and adjusting the output in the low-density area based on the gradation correction curve for totally correcting gradation characteristics, and on the low-density correction curve including the adjusting value as a parameter.

* * * * *